United States Patent [19]

Olafsson

[11] Patent Number: 6,081,567
[45] Date of Patent: *Jun. 27, 2000

[54] METHOD AND APPARATUS FOR SYNCHRONIZING A DATA COMMUNICATION SYSTEM TO A PERIODIC DIGITAL IMPAIRMENT

[75] Inventor: Sverrir Olafsson, Reykjavik, Iceland

[73] Assignee: Conexant Systems, Inc., Newport Beach, Calif.

[*] Notice: This patent is subject to a terminal disclaimer.

[21] Appl. No.: 09/326,910

[22] Filed: Jun. 7, 1999

Related U.S. Application Data

[63] Continuation of application No. 09/009,228, Jan. 20, 1998, Pat. No. 6,023,493.

[51] Int. Cl.[7] ........................................... H04L 7/00
[52] U.S. Cl. ..................... 375/354; 370/523; 370/503
[58] Field of Search ................................ 375/354, 356, 375/364, 365, 368, 342, 259, 256; 370/503, 504, 505, 509, 510, 514, 522, 523, 528

[56] References Cited

U.S. PATENT DOCUMENTS

| | | | |
|---|---|---|---|
| 4,730,312 | 3/1988 | Johnson et al. | 370/523 |
| 5,048,054 | 9/1991 | Eyuboglu et al. | 375/8 |
| 5,398,234 | 3/1995 | O'Connell et al. . | |
| 5,506,956 | 4/1996 | Cohen | 395/182.04 |
| 5,509,036 | 4/1996 | Nakata . | |
| 5,535,244 | 7/1996 | Nakatsu et al. . | |
| 5,541,967 | 7/1996 | Gluska et al. . | |
| 5,590,161 | 12/1996 | Meyn et al. . | |
| 5,598,435 | 1/1997 | Williams . | |
| 5,623,516 | 4/1997 | Brownlie et al. . | |
| 5,687,199 | 11/1997 | Dupuy . | |
| 5,729,226 | 3/1998 | Betts et al. . | |
| 5,754,594 | 5/1998 | Betts et al. . | |
| 5,761,247 | 6/1998 | Betts et al. . | |
| 5,784,405 | 7/1998 | Betts et al. . | |
| 5,812,075 | 9/1998 | Betts et al. | 341/94 |
| 5,822,359 | 10/1998 | Bruckert et al. . | |
| 5,822,371 | 10/1998 | Goldstein et al. | 375/242 |
| 5,825,816 | 10/1998 | Cole et al. | 375/222 |
| 5,825,823 | 10/1998 | Goldstein et al. | 375/286 |
| 5,838,724 | 11/1998 | Cole et al. | 375/222 |

OTHER PUBLICATIONS

*Analyzing Code Translation Characteristics of a PCM Channel and Communicating a Mutual PCM Code Signaling Set*, Dale Walsh, TIA Committee Contribution, April 9, 1997.

*Primary Examiner*—Chi H. Pham
*Assistant Examiner*—Jean B. Corrielus
*Attorney, Agent, or Firm*—Snell & Wilmer L.L.P.

[57] ABSTRACT

A pulse code modulation modem system is configured to transmit data from a first modem to a second modem over the public switched telephone network (PSTN). The PSTN employs robbed bit signaling (RBS) such that symbols affected by RBS arrive at the second modem in a periodic manner based on a period of six symbols. The modem system is configured such that signal segments are formatted and transmitted with six symbols per segment. After obtaining symbol synchronization, the second modem initializes a modulo-6 symbol counter such that the zero count corresponds to the first symbol of each received signal segment. Those symbols affected by RBS are identified and analyzed to determine optimized signal point constellations that may be used to compensate for the RBS on a symbol-by-symbol basis during subsequent encoding and decoding. Upon a loss of synchronization, the second modem resets its modulo-6 counter in response to the detection of the first symbol in a subsequent signal segment. In this manner, the modem system can again use the optimized signal point constellations determined previously.

23 Claims, 5 Drawing Sheets

6,081,567

METHOD AND APPARATUS FOR SYNCHRONIZING A DATA COMMUNICATION SYSTEM TO A PERIODIC DIGITAL IMPAIRMENT

RELATED APPLICATION

This application is a continuation of U.S. application Ser. No. 09/009,228, filed Jan. 20, 1998 now U.S. Pat. No. 6,023,493.

FIELD OF THE INVENTION

The present invention relates generally to synchronization techniques used in data communication systems, e.g., modem systems, that transmit data between remote locations. More specifically, the present invention relates to a synchronization technique for use with a data communication system that introduces digital impairments, such as robbed bit signaling, to a transmit signal.

BACKGROUND OF THE INVENTION

Digital communication systems, such as modem systems, are well known in the prior art. Such systems typically employ timing recovery techniques that are utilized to recover the symbol rate at which the data is transmitted. Such systems also use synchronization techniques that are utilized to align the receiver clock with the transmitter clock. Synchronization signals are often transmitted near the beginning of a "handshaking" procedure, during a receiver training procedure, or periodically during data transmission (to resynchronize the receive modem with the transmit modem). The prior art is replete with various timing recovery and synchronization techniques; several timing recovery schemes are discussed in Lee & Messerschmitt, DIGITAL, COMMUNICATION, pp. 737–764 (2d ed. 1996), the contents of which are incorporated herein by reference.

The current 56 kbps modem systems take advantage of the digital nature of the public switched telephone network (PSTN). The theoretical maximum data rate of 64 kbps per channel may not be realized in conventional 56 kbps modem systems that employ robbed bit signaling (RBS) to facilitate control signaling between network nodes. A particular data transmission may pass through a number of network nodes; each link may introduce RBS such that several bits are eventually robbed from the originally transmitted data codewords. The modem system can partially compensate for this type of digital impairment if it can identify the affected bits or the affected codewords.

For a given link in a 56 kbps modem transmission, RBS typically removes the least significant bit from the transmitted PCM codeword and replaces the bit with signaling information. The robbed bits are commonly forced to "ones" by the central offices, which effectively reduces the number of signal points in the signal point constellations utilized to decode the codewords affected by RBS. If the receiving modem can identify those symbols affected by the RBS, then different signal point constellations may be employed in a symbol-by-symbol basis to optimize performance and compensate for the RBS. Accordingly, a technique for synchronizing the receive modem to the RBS is needed to facilitate the application of signal point constellations to RBS-tainted symbols.

In current 56 kbps modem systems, RBS may occur in any given network link. In addition, symbols may be transmitted as a "continuous" stream or arranged in a number of signal segments or data frames having a particular number of symbols per segment or frame. The receive modem is configured to obtain and maintain synchronization with the transmit modem or network clock for purposes of timing and proper decoding. Present systems may utilize a special synchronization signal format or a symbol counting technique to monitor occurrences of RBS on a symbol-by-symbol basis. However, such techniques may break down if the receiver modem loses synchronization with the transmit modem. When such a receiver modem regains proper synchronization, it may not be possible to readily identify those symbols affected by RBS; the receiver modem may apply RBS-correcting signal point constellations where such correction is unnecessary. Untimely use of such corrective measures may introduce an undesirable number of decoding errors.

Therefore, a technique is needed to address the above disadvantages and shortcomings of prior art 56 kbps modem systems.

SUMMARY OF THE INVENTION

Accordingly, it is an advantage of the present invention that an improved synchronization procedure for use in a data communication system is provided.

Another advantage of the present invention is that it provides a mechanism for synchronizing a receive modem to a digital impairment, such as robbed bit signaling (RBS), that is introduced to the transmit signal.

Another advantage is that the present invention provides for a modem system that obtains RBS synchronization upon receiver/transmitter synchronization.

A further advantage is that RBS synchronization may be easily reestablished subsequent to a loss of receiver/transmitter synchronization.

Another advantage of the present invention is that the modem system can employ corrective signal point constellations to encode and decode RBS-tainted symbols in a reliable manner.

The above and other advantages of the present invention are carried out in one form by a synchronization method for use in a data communication system having a first device configured to communicate with a second device, where the communication network between the two devices introduces digital impairments to a transmit signal such that the digital impairments arrive at the second device in a periodic manner based on a period of N symbols. The method may begin by transmitting a plurality of signal segments from the first device to the second device, where each of the signal segments is represented by an integer multiple of N symbols. The second device then obtains synchronization associated with symbols transmitted by the first device.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF PREFERRED EXEMPLARY EMBODIMENTS

Figure 1:
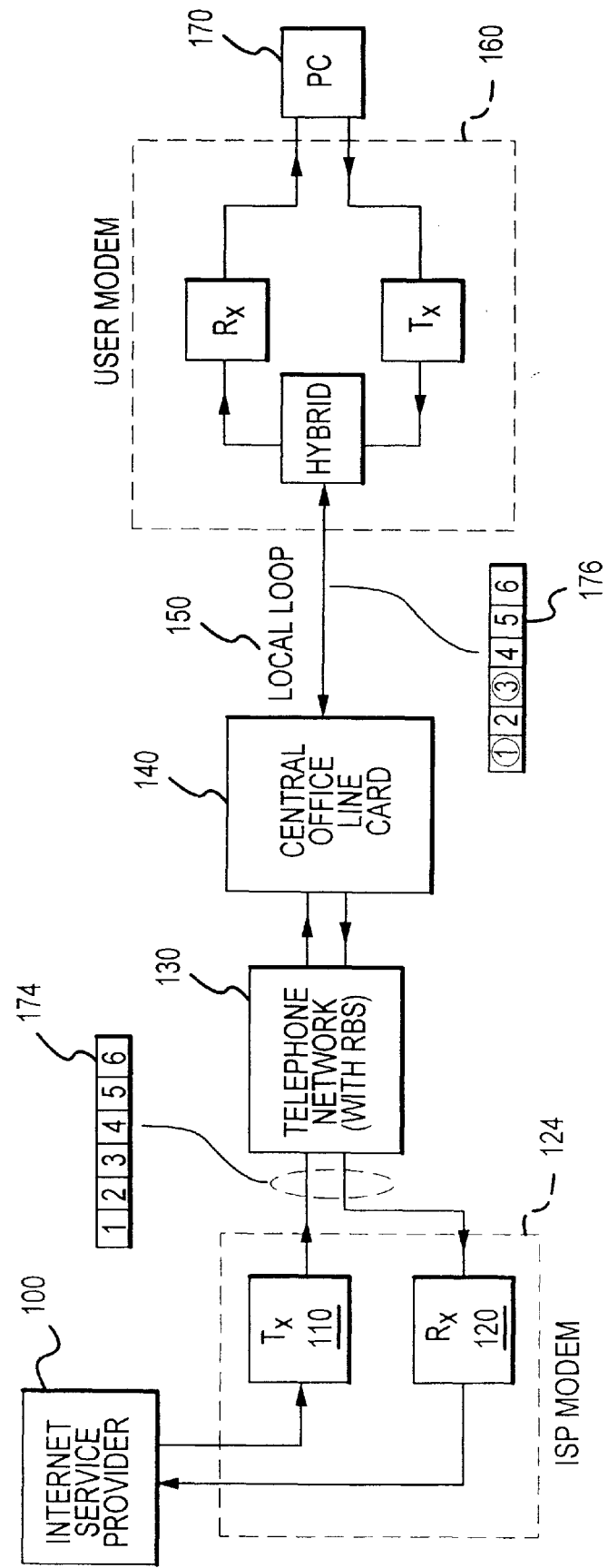
FIG. 1 is a block diagram of an exemplary 56 kbps pulse code modulation (PCM) modem environment.

FIG. 1 shows an exemplary 56 kbps pulse code modulation (PCM) based modem environment in which the present invention may operate. An internet service provider (ISP) or central site 100 is digitally connected to a telephone network 130 through a transmitter 110 and a receiver 120 resident at an ISP modem 124. Telephone network 130 is connected to a local loop 150 through a central office line card 140. Line card 140 typically has a PCM codec (not shown) implemented therein. Local loop 150 is connected to a user's personal computer (PC) 170 at the user's site through the user's modem 160. As can be appreciated by those skilled in the art, the connection between transmitter 110 to telephone network 130 is a digital connection with a typical data rate of about 64 Kbps. Since the parameters of telephone network 130 and line card 140 are dictated and set by the telephone company's specifications and operation (and particularly their use of the $\mu$-law signal point constellation), transmitter 110 needs to transmit the digital data in a particular format to fully exploit its digital connection to telephone network 130. Those skilled in the art will appreciate that the system depicted in FIG. 1 may employ any number of known signal processing, coding, and decoding techniques related to, e.g., $\mu$-law signal point constellations, shell mapping, spectral control, equalizer training, and the like. For the sake of brevity, such known techniques and systems are not described in detail herein. It should also be noted that the principles of the present invention are not limited to modem applications and that the present invention may be suitably modified or configured for deployment in any number of data communication systems.

Generally, the typical PCM modem system formats digital data for transmission from ISP modem 124 to user modem 160, where the digital data is retrieved for use by PC 170. The data may be arranged into data symbols and encoded via any number of techniques such as $\mu$-law mapping. The data symbols may then be further processed with spectral control or other signal conditioning schemes prior to being transmitted as one or more signal segments at a particular symbol rate to telephone network 130. User modem 160 eventually receives the data symbols and thereafter decodes the data to obtain the original digital data. To function efficiently, user modem 160 should be synchronized with ISP modem 124. Consequently, user modem 160 may include a timing recovery scheme that recovers the transmitted symbol rate and synchronizes the receiver at user modem 160 with transmitter 110.

Due to the digital nature of telephone network 130 and the design of current 56 kbps modem systems, digital impairments may be present within a data communication channel. For example, present 56 kbps modem systems may employ techniques to compensate for robbed bit signaling (RBS) which may occur in the digital links within telephone network 130. Although in theory 64 kbps may be allocated for any given channel, some of the bits may be "robbed" and replaced with data for use with control signaling on a link between network nodes. Each data symbol typically includes a 7-bit PCM codeword and a sign bit; the robbed bits are periodically taken from the least significant bit positions associated with the transmitted PCM codewords. The central office codec may assign "ones" to the robbed bits for purposes of decoding. Thus, unless otherwise compensated for, RBS can introduce decoding errors to the transmitted data.

Any given communication channel may be susceptible to any number of robbed bits associated with multiple network links within telephone network 130. For example, for a given network link, RBS may occur once every sixth PCM codeword, i.e., once every sixth symbol. On a subsequent link, another symbol position may be affected by RBS. FIG. 1 depicts an exemplary signal segment 174 transmitted by ISP modem 124 (for purposes of this example, signal segment 174 is six symbols long). For the particular end-to-end channel between ISP modem 124 and user modem 160, telephone network 130 may introduce RBS with respect to any number of symbols associated with signal segment 174. In this example, RBS has occurred at symbol positions 1 and 3, as indicated in signal segment 176. It should be appreciated that the present invention is not limited to any specific signal segment length and that the specific symbol locations associated with RBS may differ than that shown and described herein.

Figure 2:
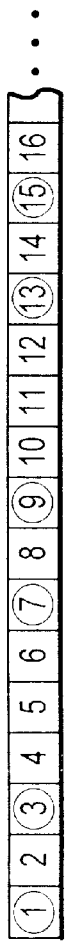
FIGS. 2–4 depict exemplary transmit signals with symbols affected by RBS.

In accordance with the present invention, telephone network 130 operates such that symbols affected by RBS arrive at user modem 160 in a periodic manner based on a period of N symbols. Thus, for the example shown in FIG. 1, RBS would occur every six symbols for symbol positions 1 and 3. FIG. 2 depicts an exemplary transmit signal formatted as a continuous stream of symbols. As shown, the RBS occurring at the first symbol periodically occurs every sixth symbol, i.e., at the seventh symbol, the thirteenth symbol, and so on. Likewise, the RBS occurring at the third symbol periodically occurs every sixth symbol, i.e., at the ninth symbol, the fifteenth symbol, and so on. The present invention takes advantage of this periodic nature of the RBS by defining and formatting all transmitted signal segments such that they are represented by an integer multiple of N symbols, where N is the period of RBS occurring at user modem 160 (although not a requirement of the present invention, the preferred exemplary embodiment described herein operates with N=6 for compatibility with the RBS period found in current 56 kbps modem systems).

Figure 3:
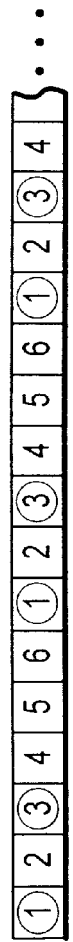
Figure 4:

FIG. 3 depicts an exemplary transmit signal defined by a plurality of signal segments, each having a length of six symbols. As shown, the periodic nature of the RBS, in conjunction with the arrangement of the signal segments, ensures that the symbol positions affected by the RBS are repeated for each six-symbol signal segment. In other words, the RBS-tainted symbols are the first and third symbols of each signal segment. It should be noted that the principles of the present invention are applicable to transmit signals that are defined by any integer multiple of N symbols, e.g., an integer multiple of six for the above examples. FIG. 4 depicts another exemplary transmit signal defined by a plurality of twelve-symbol signal segments. In this example, the RBS-tainted symbols occur at the first, third, seventh, and ninth symbols of each signal segment. In general, the present invention takes advantage of this periodic characteristic to simplify the synchronization process with respect to RBS and to effectively identify and compensate for those symbols affected by RBS.

Figure 5:
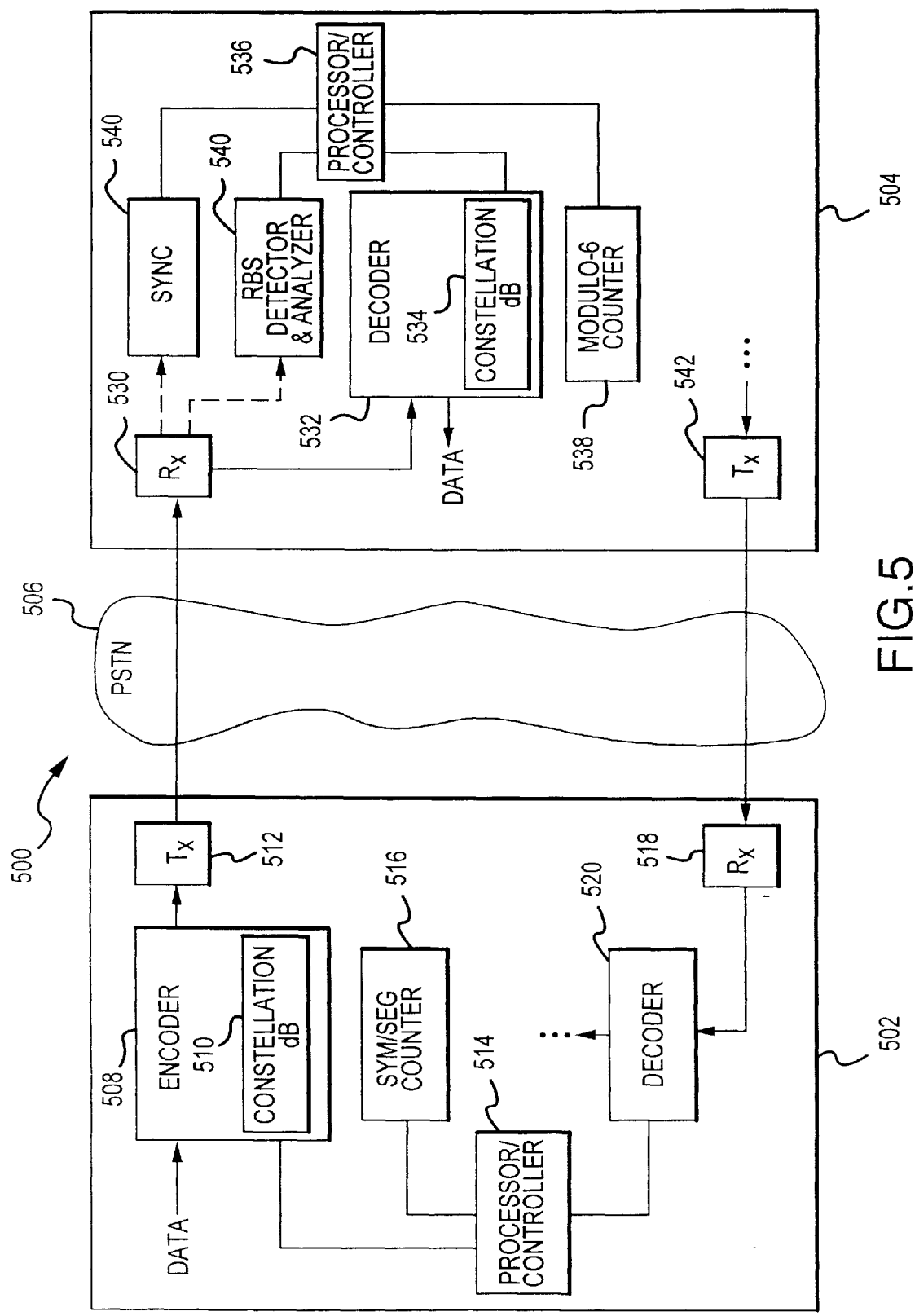
FIG. 5 is a block diagram of an exemplary modem system in which the synchronization techniques of the present invention may be incorporated.

FIG. 5 is a block diagram of a preferred exemplary modem system 500 that incorporates the synchronization features of the present invention, it will be appreciated, however, that the present invention can be implemented in combination with any number of different synchronization, timing recovery, and other signal processing techniques known in the art. For example, many suitable techniques are described in Lee & Messerschmitt, DIGITAL COMMUNICATION (2d ed. 1996), which is incorporated herein by reference. Accordingly, the particular implementations shown and described herein are merely exemplary and are not intended to limit the scope of the present invention in any way. Indeed, for the sake of brevity, various timing recovery, automatic gain control (AGC). synchronization, training, decoding, and other techniques employed by modem system 500 may not be described in detail herein.

It should be appreciated that the functional blocks depicted in FIG. 5 are merely exemplary and are not intended to represent physical limitations of modem system 500. These, and other functional elements of modem system 500, may be implemented with any number of semiconductor devices, including memory elements configured to store data, functional parameters, software instructions, and other information, and microprocessors configured to carry out the various processes described herein. Furthermore, modem system 500 may include conventional hardware or software elements configured to perform well known operations related to digital signal processing and/or data transmission; such elements are not described in detail herein.

Generally, modem system 500 includes a first modem, e.g., modem 502, and a second modem, e.g., modem 504. Modems 502, 504 are generally configured in accordance with known principles to communicate via the public switched telephone network (PSTN) 506. In current 56 kbps modem systems, PSTN 506 typically introduces RBS to a number of transmitted symbols, as described above.

First modem 502 may include a processor/controller 514 configured to carry out various tasks associated with the operation of modem 502. Although not shown, modem 502 may incorporate additional processors or control elements as necessary to suitably support its operation. Processor/controller 502 may suitably interact with other functional components of modem 502 to thereby access and manipulate data or monitor and regulate the operation of modem 502.

First modem 502 preferably includes an encoder 508 configured to encode digital data in accordance with the particular encoding protocol employed by modem system 500. For example, $\mu$-law or A-law encoding techniques are used in conventional modem systems in accordance with well-established standards. The output signal generated by encoder 508 may include information for transmission during a data mode, synchronization or training signals for transmission during an initialization mode, or control or other signaling data employed by modem system 500. A signal point constellation database 510 may be associated with encoder 508, as depicted in FIG. 5. It should be appreciated that database 510 need not be an integral part of encoder 508 and that modem 502 may implement database 510 in a different manner than that shown. As described in more detail below, database 510 may be employed by modem 502 to store a plurality of signal point constellations associated with specific symbol positions within a segment. Such constellations are suitably used to facilitate the transmission of signal segments from modem 502 to modem 504. For example, compensating signal point constellations may be derived and stored for use during encoding and decoding of signal points associated with RBS to optimize the performance of modem system 500 in the presence of RBS.

Modem 502 includes a transmitter 512, which is configured to transmit encoded data symbols in accordance with general PCM techniques. In accordance with one aspect of the present invention, modem 502 is configured to transmit signal segments that have been formatted such that each signal segment is represented by an integer multiple of N symbols, where N is the period with which RBS-tainted symbols repeat at modem 504 (as described above). Processor/controller 514 may be configured to perform such formatting to ensure that each signal segment is a multiple of N symbols long. In addition, modem system 500 may be governed by applicable standards such that certain signals, e.g., predetermined training signals, control signals, and the like, are defined to be a multiple of N symbols long. In accordance with one aspect of the present invention, a period of silence may be transmitted by modem 502 in the form of one or more signal segments having a multiple of N "zero" symbols.

Modem 502 may employ a symbol or segment counter 516 to monitor the relative symbol positions associated with signal segments transmitted by modem 502. Counter 516 may be employed to enable encoder 508 to associate particular signal point constellations with different symbol counts within a segment. In one embodiment where signal segments are represented by six symbols, counter 516 may be configured as a modulo-6 counter. Counter 516 may be configured to function in accordance with any number of known digital signal processing techniques.

Modem 502 includes a receiver 518, which may be configured in accordance with conventional modem technology. Receiver 518 is configured to receive data from modem 504; such data may include encoded information bits, control signals, functional parameters or identifiers, and any other data employed by conventional modem systems. For example, and as described in more detail below, modem 504 may be configured to send information indicative of optimized signal point constellations to modem 502 for use during transmission of subsequent signal segments. Of course, modem 502 may employ any suitable alternative device or technique for receiving the optimized signal point constellations from modem 504. A decoder 520 may be used to decode any signals transmitted by modem 504 to modem 502, including the signal that conveys the optimized constellations.

Signal segments are suitably transmitted over a forward channel to modem 504 in accordance with conventional transmission techniques. As described above, signal segments transmitted through PSTN 506 may be subject to RBS in any number of network links. Eventually, the signal segments are received at a receiver 530 located at modem 504; modem 504 processes the received signals to obtain the original digital data encoded by modem 502. It should be noted that receiver 530 may include any number of additional components (that may be known in the art) for decoding, gain control, timing- recovery, equalization, conditioning, or other processing of the received signal.

Like modem 502, modem 504 may include a processor/controller 536 configured to carry out various tasks associated with the operation of modem 504. Processor/controller 536 may suitably interact with other functional components of modem 504 to access and manipulate data or monitor and regulate the operation of modem 504. For example, processor/controller 536 may be configured to operate in conjunction with a decoder 532 to suitably decode the received symbols in accordance with the same encoding scheme employed by encoder 508. Decoder 532 may be configured in accordance with known signal processing techniques. As with encoder 508, decoder 532 may have a signal point constellation database 534 associated therewith. Database 534 is preferably utilized to store different signal point constellations that may be optimized for use with particular symbol counts within a given signal segment. In accordance with the present invention, the same optimized signal point constellations may be used for encoding and decoding of individual symbols when modem 504 is synchronized with modem 502 and when counters 516 and 538 are aligned. This enables modem system 500 to effectively compensate for RBS or channel characteristics on a symbol-by-symbol basis.

A symbol counter, such as a modulo-6 symbol counter 538, is preferably utilized to enable modem 504 to correctly apply the appropriate signal point constellation to the received symbols. To enable synchronized operation of encoder 508 and decoder 532, processor/controller 536 may initialize or reset counter 538 in accordance with a synchronization scheme 540 performed by modem 504. It should be noted that synchronization scheme 540 may perform any number of conventional synchronization techniques known to those skilled in the art and that the present invention is not limited to any particular synchronization methodology. In the preferred embodiment, synchronization scheme 540 may suitably detect one or more synchronization signal segments transmitted by modem 502 during a start-up period or during a re-synchronization procedure.

After detection of such a synchronization signal, modem 504 may reset counter 538 in response to receipt of an initial signal segment transmitted after the synchronization signal. For example, modem 504 may reset counter 538 upon or after receipt of a first symbol of a subsequent signal segment that follows the initial segment. Alternatively, the resetting of counter 538 may be prompted by the detection or receipt of any suitable reference-position symbol (i.e., other than the first symbol) associated with the initial signal segment or associated with a subsequent signal segment. Of course, use of a different reference symbol position may require additional processing to compensate for any applicable offset between counters 538 and 516. Resetting counter 538 based upon a subsequent signal segment may be desirable in applications where it is difficult to accurately or efficiently detect the first symbol of the initial signal segment immediately received after the synchronization signal. Eventually, when modem 504 is synchronized with modem 502, counter 538 will maintain a symbol count consistent with modem 502.

Once modem 504 is synchronized with modem 502, processor/controller 536 may also serve to designate which signal point constellation should be used by decoder 532 to decode the current symbol. As described above, modem 502 preferably encodes data using signal point constellations (that may differ from one another) that have been optimized to compensate for PBS. Consequently, to avoid introducing decoding errors, modem 502 and modem 504 should use the same constellations on a symbol-by-symbol basis. It should be noted that the constellations may also be optimized according to any number of channel characteristics, the particular configuration of receiver 530, or the use of digital pads. In the context of the present invention, a "digital pad" may be a circuit configuration or a digitally implemented process applied to the transmitted codewords that emulates the effect of an analog attenuator. For example, a digital pad may employ digital techniques such as conversion tables to transform a codeword representing a given signal point magnitude into a different codeword representing a reduced signal point magnitude.

As described above, modem system 500 preferably uses compensating constellations that are. optimized in response to the presence and effects of RBS. Accordingly, modem 504 may include an RBS detector/analyzer 540, which may be configured in accordance with conventional methodologies. RBS detector/analyzer 540 preferably detects the presence of RBS in a received signal and determines the symbol positions, relative to each of the received signal segments, where RBS was introduced by PSTN 506. RBS detector/analyzer 540 (or any suitable functional component resident at modem 504) may be further configured to derive, for each symbol position that may be affected by RBS, the compensating signal point constellation for use during subsequent encoding and decoding of symbols located at that position. The determination of the optimized signal point constellations may be performed during transmission of one or more known training or diagnostic signal segments (after modem 504 has been synchronized with modem 502).

Once modem 504 has determined the preferred signal point constellations for use during subsequent data transmission, a transmitter 542 is preferably utilized to send information indicative of the optimized signal point constellations to modem 502. In the preferred embodiment, the information transmitted by transmitter 542 is encoded prior to transmission over PSTN 506. Upon receipt of this information, modem 502 performs decoding and processing to obtain the optimized signal point constellations for subsequent use by encoder 508.

Figure 6:
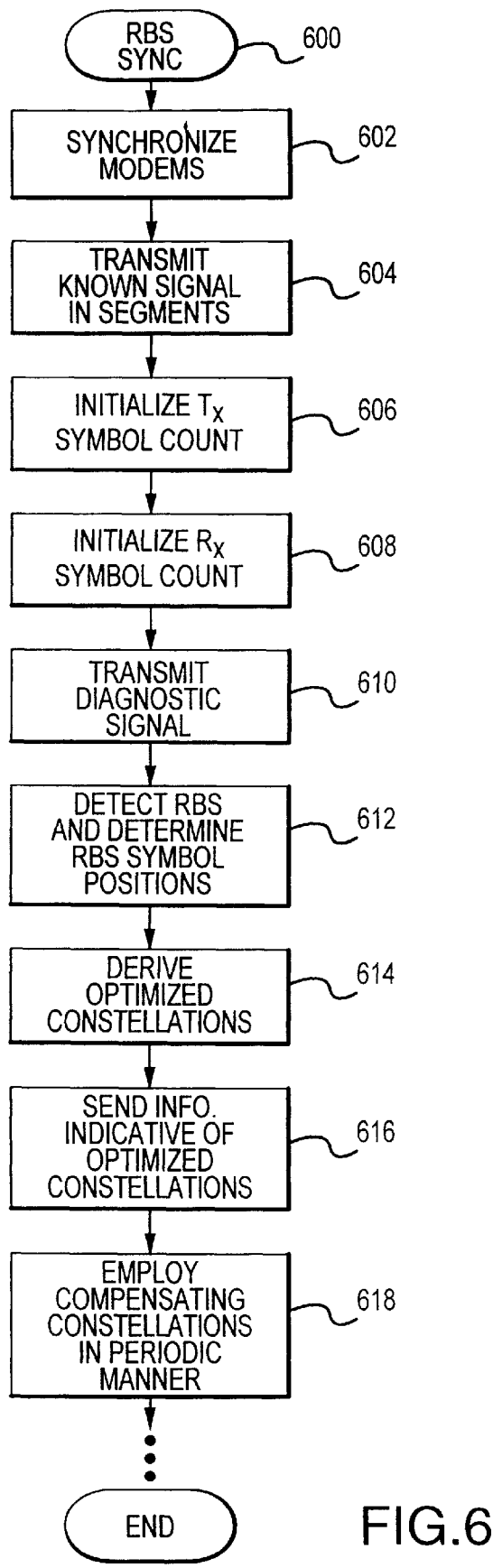
FIG. 6 is a flow diagram of an RBS synchronization process that may be carried out by the modem system shown in FIG. 5.

FIG. 6 is a flow diagram of an RBS synchronization process 600 that may be performed by a modem system, such as modem system 500. Process 600 may be performed in addition to, or as an integral part of, one or more other processes related to the overall functionality of modem system 500. Furthermore, process 600 merely illustrates how the present invention may be implemented in an exemplary modem system; the specific number and ordering of tasks may not necessarily be as shown and described herein.

Process 600 may begin with a task 602, during which modem 504 is synchronized to modem 502. In the preferred embodiment, a predetermined synchronization signal is transmitted from modem 502 during a start-up period; modem 504 may also be trained during this period. Although not a requirement of the invention, the synchronization signal may be formatted into segments each having N symbols, where N is a multiple of the RBS period as described above.

Following task 602, a task 604 may be performed to cause modem 502 to transmit a known signal having one or more signal segments, each signal segment being represented by an integer multiple of N symbols. For purposes of this exemplary embodiment, N equals the RBS period of six (common to current 56 kbps modem systems). In one preferred embodiment, this known signal is configured in a pseudo-random manner, which enables modem 504 to train the equalizers (not shown) in receiver 530 and to train the echo cancelers (not shown) in transmitter 512. Receiver 530 may also utilize this known signal to analyze the effects of RBS, as described in more detail below in connection with a diagnostic signal. Upon transmission of the first symbol of the pseudo-random signal, counter 516 (see FIG. 5) is preferably initialized (task 606) to begin monitoring the symbol positions associated with each subsequent signal segment.

After (or in response to) receipt of an initial segment associated with the pseudo-random signal, a task 608 is performed to initialize counter 538 associated with modem 504. As described above, the initialization of counter 538 may be delayed until one or more subsequent signal segments are received at modem 504 to ensure that counter 538 is accurately set to a zero state to identify the first symbol in a signal segment. Consequently, this first symbol is associated with the same zero count maintained by counters 516 and 538 located at moderns 502 and 504, respectively. In this respect, counter 538 may be considered to be synchronized or aligned with counter 516. As described above, counter 538 is preferably a modulo-6 counter in the exemplary embodiment; counter 538 automatically resets itself after counting six symbols. Thus, as long as modem 502 continues to transmit signal segments having six symbols, counter 538 will properly track counter 516.

The above counting scheme is preferably maintained regardless of the information conveyed by each symbol. For example, the present invention is configured such that periods of silence (e.g., symbols with all bits set to zero, symbols corresponding to signal points having the lowest magnitude relative to other signal points used in the current constellation, or the like) may be transmitted as one or more signal segments (the only requirement is that the signal segment contain the appropriate number of symbols). In contrast, prior art systems that rely solely upon clock estimation techniques may not function effectively during periods of silence. Such prior art systems may not be able to accurately maintain a symbol count during long or arbitrary periods of silence. For example, to resume transmission after an arbitrary period of silence, prior art systems may perform a resynchronization process to align the receiver with the transmitter and a subsequent resynchronization process to align the RBS-framing with that of the transmitter. A prior art system that employs symbol counters must re-align the transmitter and receiver counters by, e.g., transmitting a reference sequence to reset the counters or performing a suitable reinitialization procedure.

In contrast to such prior art systems, if clock synchronization has been maintained by modem system 500 throughout a period of silence, then no further synchronization processes are required because counters 516 and 538 will have preserved their alignment during the silence. If, however, clock synchronization is not maintained, then receiver 530 may first resynchronize its clock, then align counter 538 to counter 516 by detecting a transition from one segment to another using the techniques described below in connection with process 700.

After counter 538 has been initialized, a diagnostic signal containing at least one signal segment may be transmitted from modem 502 to modem 504 (task 610). Each diagnostic signal segment is formatted in accordance with the above principles; in this example, each diagnostic signal segment is a multiple of six symbols long. It should be appreciated that any diagnostic signal having suitable characteristics may be transmitted during task 610. For example, the preferred embodiment employs a diagnostic signal that contains most of the μ-law codewords likely to be used for the particular transmission. Thus, an exemplary diagnostic signal may include more than 100 symbols representing various constellation signal points. It should be noted that the particular format of the diagnostic signal may vary from system to system. The diagnostic signal is received by modem 504 and analyzed during a task 612.

During task 612, RBS detector/analyzer 540 (see FIG. 5) suitably detects the effect of RBS in the received signal segments and determines the symbol positions (if any) where RBS was introduced to the signal. Due to the periodic nature of the RBS, detector/analyzer 540 need only determine the RBS-affected symbol positions in any one signal segment; all other signal segments should be similarly affected. Task 612 may employ any number of conventional detection schemes known to those skilled in the art. Counter 538 may be accessed or monitored during task 612 to suitably identify the symbol count associated with RBS-tainted symbols. A task 614 may also be performed to derive optimized signal point constellations for use during subsequent encoding and decoding of symbols processed by modem system 500. One form of optimized constellation is a compensating constellation for use during encoding and decoding of symbols affected by RBS. Other optimized constellations may be derived in response to conventional line probing techniques that determine transmission characteristics of the current channel. Task 614 is preferably performed to derive a constellation for each symbol position associated with the formatted segment length, e.g., six for the example described herein. The different signal point constellations for the various symbol positions may be stored in database 534. It should be noted that modem system 500 need not employ a unique signal point constellation for each symbol position.

For purposes of the present invention, task 614 may "drive" the optimized signal point constellations by analyzing the RBS information obtained in connection with the diagnostic signal and selecting from a group of predetermined constellations. In this manner, any number of optimized signal point constellations can be stored at modem 504; such stored constellations may be optimized in accordance with any number of factors such as the transmit power level, the use of digital pads and the amount of attenuation caused by the digital pads, the location of digital pads relative to where RBS is introduced, and other known sources of digital impairments. Accordingly, modem system 500 need not individually determine new signal point constellations for each transmit session.

Following task 614, a task 616 may be performed to cause modem 504 to send information indicative of the optimized signal point constellations, and their corresponding symbol positions, to modem 502. Processor/controller 536 may be configured to format the data into a form suitable for encoding and transmission by transmitter 542. Such techniques are generally known in the digital signal processing field. The information is eventually received by receiver 518 at modem 502, decoded by decoder 520, and appropriately processed. In the preferred embodiment, the particular signal point constellations, with their corresponding symbol positions, are stored in database 510 for subsequent use during encoding.

A task 618 may be subsequently performed to cause modem system 500 to employ the compensating signal point constellations in the periodic manner with which RBS is introduced into the transmit signal. In other words, if the current channel causes RBS to be present in the first and third symbol positions when received at modem 504, then the appropriate signal point constellations "assigned" to the first and third symbol positions will be used whenever those particular symbols are encoded and decoded. As described above, other optimized constellations may be employed in this periodic manner, whether or not they compensate for the presence of RBS.

The present invention takes advantage of the periodic nature of RBS within signal segments received at modem 504 to effectively compensate for the RBS. If modem 504 remains synchronized with modem 502, then the occurrence and affect of RBS within a signal segment can be predictable on a symbol-by-symbol basis (as long as the signal segments are consistently arranged to have the specified number of symbols). However, in practical modem systems, synchronization may be lost from time to time. Prior art modem systems may require a reanalysis of the channel characteristics or the effects of RBS upon resynchronization to redetermine the individual signal point constellations. In contrast, in accordance with one aspect of the present invention, if modem 504 loses and thereafter regains synchronization, the symbol locations affected by RBS remain unchanged and the same optimized signal point constellations may be utilized as though synchronization was never lost. This feature enables modem system 500 to regain an optimized transmission mode in a reduced amount of time compared to prior art modem systems.

Figure 7:
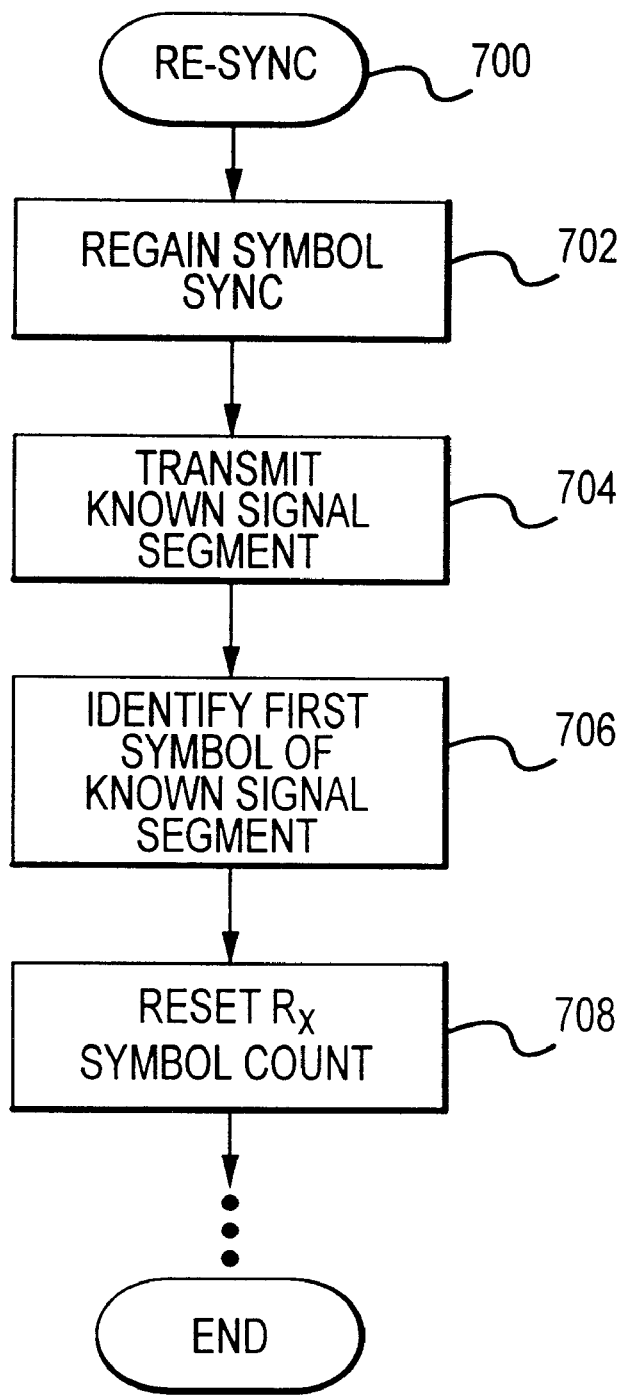
FIG. 7 is a flow diagram of a resynchronization process that may be performed by the modem system shown in FIG. 5.

FIG. 7 is a flow diagram that depicts a resynchronization process 700 that may be performed by modem system 500 when modem 504 loses synchronization with modem 502. The following description of process 700 assumes that modem 502 maintains "synchronization" with its symbol counter 516 and/or a network counter (not shown) at all times. Process 700 may begin with a task 702, during which modem 504 regains symbol synchronization with modem 502. Those skilled in the art will recognize that task 702 may be initiated by modem 504 upon a determination that the initial synchronization has been lost. Various renegotiation, signaling, and conventional symbol resynchronization procedures may be performed by modem system 500 to enable modem 504 to regain symbol synchronization with modem 502.

Following task 702, the symbol timing of modem 504 is preferably aligned with modem 502.

However, the respective symbol counters 538 and 516 may not be operating in a synchronized manner. If symbol counters 538 and 516 are not aligned, then the various optimized signal point constellations will not be applied in a consistent manner during encoding and decoding Accordingly, a task 704 is preferably performed to cause modem 502 to transmit one or more repetitions of a known signal segment (having six symbols in accordance with the above example). In an exemplary embodiment, this known signal segment may be similar to a V.34 Modulation Parameter (MP) sequence or any suitable segment recognizable by modem 504. Task 704 may be performed in response to the procedure described above in connection with task 702.

Modem 504 eventually receives the known signal segment and determines its significance as a reference sequence. Next, a task 706 is preferably performed, during which modem 504 suitably identifies a reference-position symbol of the known signal segment (or a reference-position symbol of a subsequent signal segment). In the preferred embodiment, task 706 identifies the first symbol of the known signal segment. Modem 504 may employ conventional techniques to perform task 706. For example, processor/controller 536 (see FIG. 5) may recognize the known signal segment and, consequently, determine the appropriate symbol count corresponding to the symbols in the known signal segment.

Preferably, after modem 504 identifies the first symbol of the known signal segment, a task 708 is performed. Task 708 resets counter 538 in response to the identification of the first symbol of the known signal segment. In other words, task 708 causes counter 538 to again associate the first symbol of received signal segments with a zero count. Thus, following completion of task 708, counter 538 is consistent with counter 516 and modem 504 is resynchronized with modem 502 with respect to symbol timing and monitoring of symbol positioning.

Following task 708, process 700 may end and modem system 500 may proceed in accordance with the above principles. Notably, the same optimized signal point constellations obtained prior to the loss of initial synchronization can be utilized during subsequent encoding and decoding. This enables modem system 500 to take advantage of the consistent characteristics of the communication channel and the effects of RBS, neither of which should substantially vary during a given communication session over the same end-to-end link. This aspect of the present invention allows modem system 500 to efficiently establish a normal operating mode without having to perform a lengthy reanalysis of the RBS symbol positions or a redetermination of the optimized signal point constellations. It should be appreciated that, during such renegotiation procedures, modem system 500 may be configured to alter the data rate, which results in the use of signal point constellations having more or less signal points than before the renegotiation. In such a situation, modem system 500 may utilize the RBS information obtained during the previous analysis and apply such information to derive or select the appropriate signal point constellations for use with subsequent transmissions at the new data rate. Again, the leveraging of the previously obtained information enables modem system 500 to efficiently determine optimized signal point constellations without having to repeat the entire RBS analysis.

In summary, the present invention provides an improved synchronization procedure for use in a modem system. The present invention provides a mechanism for synchronizing a receive modem to a digital impairment, such as RBS, that is introduced to the transmit signal. In accordance with one aspect of the invention, a modem system can readily obtain RBS synchronization upon synchronization of the receive modem with the transmit modem. In addition, RBS synchronization and a corresponding RBS compensation technique may be easily reestablished subsequent to a loss of synchronization between the receive modem and the transmit modem. An exemplary modem system employs corrective signal point constellations to encode and decode RBS-tainted symbols in a reliable manner.

The present invention has been described above with reference to various exemplary embodiments. However, those skilled in the art will recognize that changes and modifications may be made to the preferred embodiments without departing from the scope of the present invention. For example, the particular signal segment format may differ than that described herein. In addition, various signal segments have been referred to (e.g., synchronization signal, subsequent signal segment, initial segment, MP sequence) for the sake of convenience and to better describe the invention. However, those skilled in the art will appreciate that these designations in no way limit the practical application of the invention. These and other changes or modifications are intended to be included within the scope of the present invention, as expressed in the following claims.

What is claimed is:

1. A synchronization method for use in a data communication system having a first device configured to communicate with a second device over a communication network, said communication network introducing a number of digital impairments to a transmit signal such that said digital impairments arrive at said second device in a periodic manner based on a period of N symbols, said method comprising the steps of:

transmitting a plurality of signal segments from said first device to said second device, each of said signal segments being represented by an integer multiple of N symbols;

obtaining synchronization with symbols transmitted by said first device, said obtaining step being performed by said second device;

determining a symbol position, relative to each of said signal segments where a digital impairment was introduced by said communication network, said determining step being responsive to said obtaining step; and deriving a compensating signal point constellation for use during subsequent encoding and decoding of signal points associated with said symbol position, said deriving step being performed by said second device.

2. A method according to claim 1, wherein said digital impairment comprises robbed bit signaling (RBS).

3. A method according to claim 1, wherein at least one of said signal segments is a period of silence.

4. A method according to claim 1, wherein N=6.

5. A method according to claim 1, wherein said transmitting step transmits signal segments having N symbols.

6. A synchronization method for use in a data communication system having a first device configured to communicate with a second device over a communication network, said communication network employing robbed bit signaling (RBS) such that symbols affected by RBS arrive at said second device in a periodic manner based on a period of N symbols, said method comprising the steps of:

transmitting a plurality of signal segments from said first device to said second device, each of said signal segments being represented by an integer multiple of N symbols;

receiving said signal segments at said second device;

synchronizing said second device to symbols transmitted by said first device; and initializing a modulo-N symbol counter at said second device in response to receipt of an initial signal segment by said second device, said modulo-N symbol counter being synchronous to a symbol count associated with said signal segments.

7. A method according to claim 6, further comprising the steps of:

detecting the effect of RBS in at least one of said received signal segments, said detecting step being performed by said second device; and determining at least one symbol position, relative to said at least one of said received signal segments, where RBS was employed by said communication network.

8. A method according to claim 7, further comprising the step of deriving, for each of said at least one symbol position, a compensating signal point constellation for use during subsequent encoding and decoding of symbols affected by RBS.

9. A method according to claim 6, wherein N=6.

10. A method according to claim 6, wherein said transmitting step transmits signal segments having N symbols.

11. A method according to claim 6, wherein said initializing step initializes said modulo-N symbol counter in response to receipt of a first symbol of a subsequent signal segment that follows said initial signal segment.

12. A method according to claim 6, wherein said initializing step initializes said modulo-N symbol counter after receipt of a reference-position symbol of said initial signal segment.

13. A data communication system having a first device configured to transmit signal segments to a second device over a communication network, said communication network introducing a number of digital impairments to a transmit signal such that said digital impairments arrive at said second device in a periodic manner based on a period of N symbols, said data communication system comprising:

means for formatting a plurality of signal segments such that each of said signal segments is represented by an integer multiple of N symbols;

means for transmitting said plurality of signal segments from said first device to said second device;

means for synchronizing said second device to symbols transmitted by said first device; and means for determining at least one symbol position, relative to each of said signal segments, where a digital impairment was introduced by said communication network; wherein:

said second device is configured to derive at least one compensating signal point constellation for use during subsequent encoding and decoding of signal points associated with said at least one symbol position; and said first device is configured to employ said at least one compensating signal point constellation in said periodic manner with respect to said at least one symbol position.

14. A data communication system according to claim 13, wherein said digital impairment comprises robbed bit signaling (RBS).

15. A data communication system according to claim 13, wherein N=6.

16. A data communication system according to claim 13, wherein said means for transmitting is configured to transmit signal segments having N symbols.

17. In a data communication system having a first device configured to transmit data to a second device, a method for compensating for digital impairments in a transmit signal, where said digital impairments arrive at said second device in a periodic manner based on a period of N symbols, said method comprising the steps of:

formatting a plurality of signal segments such that each of said signal segments is represented by an integer multiple of N symbols;

starting a first symbol counter at said first device upon transmission of a first symbol associated with one of said signal segments;

transmitting said signal segments from said first device to said second device;

initializing a second symbol counter at said second device after receipt of said first symbol by said second device; and utilizing compensating signal point constellations, in response to said second symbol counter, for symbols affected by digital impairments.

18. A method according to claim 17, further comprising the step of determining at least one symbol position, relative to each of said signal segments, where a digital impairment was introduced, said determining step being responsive to said initializing step.

19. A method according to claim 17, wherein said digital impairment comprises robbed bit signaling, (RBS).

20. A method according to claim 17, further comprising the step of selecting a plurality of optimized signal point constellations associated with different states of said second symbol counter, said selecting step being performed by said second device.

21. A method according to claim 20, further comprising the step of sending information indicative of said optimized signal point constellations from said second device to said first device.

22. A method according to claim 17, wherein said second symbol counter comprises a modulo-N symbol counter.

23. A method according to claim 17, wherein:

said first symbol is associated with an initial signal segment; and said initializing step initializes said second symbol counter in response to receipt of a first symbol of a subsequent signal segment that follows said initial signal segment.

* * * * *